(12) United States Patent
Engel et al.

(10) Patent No.: US 9,905,363 B2
(45) Date of Patent: Feb. 27, 2018

(54) CAPACITOR ARRANGEMENT

(71) Applicant: EPCOS AG, München (DE)

(72) Inventors: Günter Engel, Leibnitz (AT); Michael Schossmann, Deutschlandsberg (AT); Markus Koini, Seiersberg (AT); Andrea Testino, Würenlingen (CH); Christian Hoffmann, München (DE)

(73) Assignee: EPCOS AG, München (DE)

( * ) Notice: Subject to any disclaimer, the term of this patent is extended or adjusted under 35 U.S.C. 154(b) by 175 days.

(21) Appl. No.: 14/767,015

(22) PCT Filed: Feb. 10, 2014

(86) PCT No.: PCT/EP2014/052545
§ 371 (c)(1),
(2) Date: Aug. 11, 2015

(87) PCT Pub. No.: WO2014/135340
PCT Pub. Date: Sep. 12, 2014

(65) Prior Publication Data
US 2015/0371778 A1    Dec. 24, 2015

(30) Foreign Application Priority Data

Mar. 7, 2013    (DE) .................. 10 2013 102 278

(51) Int. Cl.
*H01G 4/232*    (2006.01)
*H01G 4/224*    (2006.01)
(Continued)

(52) U.S. Cl.
CPC ......... *H01G 4/2325* (2013.01); *H01G 4/1209* (2013.01); *H01G 4/224* (2013.01); *H01G 4/232* (2013.01); *H01G 4/30* (2013.01)

(58) Field of Classification Search
CPC ...... H01G 4/2325; H01G 4/1209; H01G 4/30; H01G 4/224; H01G 4/232
See application file for complete search history.

(56) References Cited

U.S. PATENT DOCUMENTS

| 1,902,942 | A | * | 3/1933 | Bailey ..................... H01G 2/12 |
| | | | | 361/308.1 |
| 3,593,072 | A | * | 7/1971 | Bailey ..................... H01G 4/32 |
| | | | | 361/274.3 |

(Continued)

FOREIGN PATENT DOCUMENTS

| CN | 102667979 A | 9/2012 |
| DE | 4111401 A1 | 10/1992 |

(Continued)

OTHER PUBLICATIONS

Maher, Effects of silver doping on the physical and electrical properties of PLZT ceramics, Jun. 1983, Journal of American Ceramic Society, vol. 66, No. 6, pp. 408-413.*

(Continued)

*Primary Examiner* — David M Sinclair
(74) *Attorney, Agent, or Firm* — Slater Matsil, LLP

(57) ABSTRACT

A capacitor arrangement includes at least one ceramic multilayer capacitor with a main body having ceramic layers and first and second electrode layers arranged therebetween. The capacitor also has a first external contact and a second external contact on mutually opposite side surfaces. The first external contact is electrically conductively connected to the first electrode layers and the second external contact is electrically conductively connected to the second electrode layers. A contact arrangement includes two metallic contact plates, between which the at least one ceramic multilayer capacitor is arranged. The first and second external contacts (Continued)

are electrically conductively connected in each case to one of the metallic contact plates.

20 Claims, 4 Drawing Sheets

(51) Int. Cl.
*H01G 4/12* (2006.01)
*H01G 4/30* (2006.01)

(56) References Cited

U.S. PATENT DOCUMENTS

| | | | |
|---|---|---|---|
| 4,401,843 A | 8/1983 | Harper et al. | |
| 4,458,294 A * | 7/1984 | Womack | H01G 4/2325 338/309 |
| 4,617,609 A * | 10/1986 | Utner | H01G 2/06 29/25.42 |
| 4,819,128 A | 4/1989 | Florian et al. | |
| 4,903,166 A | 2/1990 | Galvagni | |
| 5,051,542 A | 9/1991 | Hernandez | |
| 5,142,439 A | 8/1992 | Huggett et al. | |
| 5,251,094 A | 10/1993 | Amano et al. | |
| 5,367,437 A * | 11/1994 | Anderson | H01G 4/38 257/533 |
| 5,388,024 A * | 2/1995 | Galvagni | H01G 2/065 29/25.42 |
| 6,362,948 B1 | 3/2002 | Moriwaki et al. | |
| 6,473,291 B1 | 10/2002 | Stevenson | |
| 6,515,844 B1 | 2/2003 | Moriwaki et al. | |
| 7,429,817 B2 | 9/2008 | Asano et al. | |
| 7,781,358 B2 | 8/2010 | Hackenberger et al. | |
| 8,950,652 B2 | 2/2015 | Schafer et al. | |
| 2003/0231455 A1* | 12/2003 | Devoe | H01G 4/35 361/301.3 |
| 2004/0207972 A1 | 10/2004 | Kazama | |
| 2004/0264105 A1 | 12/2004 | Galvagni et al. | |
| 2006/0232170 A1 | 10/2006 | Takaoka et al. | |
| 2007/0164639 A1 | 7/2007 | Ohrnori et al. | |
| 2007/0188975 A1 | 8/2007 | Togashi et al. | |
| 2008/0130199 A1* | 6/2008 | Omura | H01G 2/06 361/321.3 |
| 2008/0291602 A1 | 11/2008 | Devoe | |
| 2009/0301606 A1* | 12/2009 | Ueshima | B23K 35/0244 148/24 |
| 2010/0123995 A1 | 5/2010 | Otsuka et al. | |
| 2011/0110012 A1* | 5/2011 | Horikoshi | H01G 9/06 361/301.4 |
| 2012/0019977 A1* | 1/2012 | Kawamoto | C04B 35/47 361/281 |
| 2012/0134069 A1* | 5/2012 | Dooley | H01G 4/30 361/330 |
| 2012/0236462 A1 | 9/2012 | Haruki et al. | |
| 2012/0281335 A1 | 11/2012 | Engel et al. | |
| 2013/0027843 A1 | 1/2013 | Seo et al. | |
| 2013/0343027 A1* | 12/2013 | Perea | H01C 1/14 361/813 |
| 2014/0036411 A1 | 2/2014 | Dillmann et al. | |
| 2015/0131200 A1 | 5/2015 | Engel et al. | |

FOREIGN PATENT DOCUMENTS

| | | | |
|---|---|---|---|
| DE | 19921109 A1 | 12/1999 | |
| DE | 19929735 A1 | 1/2000 | |
| DE | 102007000357 A1 | 1/2008 | |
| DE | 102009040076 A1 | 3/2011 | |
| DE | 102011012631 A1 | 8/2012 | |
| DE | 102011007325 A1 | 10/2012 | |
| EP | 0302274 A1 | 2/1989 | |
| JP | S6465825 A | 3/1989 | |
| JP | 01220421 A * | 9/1989 | .............. H01G 4/30 |
| JP | 04039916 A * | 2/1992 | |
| JP | H08123278 A | 5/1996 | |
| JP | H08213218 A | 8/1996 | |
| JP | 8288174 A | 11/1996 | |
| JP | 200275780 A | 3/2002 | |
| JP | 2004336014 A | 11/2004 | |
| JP | 2006093528 A | 4/2006 | |
| JP | 2007189099 A | 7/2007 | |
| JP | 2009006337 A | 1/2009 | |
| JP | 2009164189 A | 7/2009 | |
| JP | 2009164190 A | 7/2009 | |
| JP | 2010245381 A | 10/2010 | |
| JP | 2013012688 A | 1/2013 | |
| JP | 2013030775 A | 2/2013 | |
| WO | 2011085932 A1 | 7/2011 | |
| WO | 2013152887 A1 | 10/2013 | |

OTHER PUBLICATIONS

Chen, E., et al., "Ripple Current Confusion," KEMET Electronics Corp., Sep. 2004, 2 pages.

Clelland, I.W., et al., "Recent Advances in Capacitor Technology with Application to High Frequency Power Electronics and Voltage Conversion," Paktron Division of Illinois Tool Works Inc., 14th Annual Applied Power Electronics Conference & Exposition (APEC), Mar. 1999, 7 pages.

Engel, G.F., "Effective Reduction of Leakage Failure Mode after Flex Cracking Events in X7R-type Multilayer Ceramic Capacitors (MLCCs) by using Internal Series Connection (MLSCs)," EPCOS OHG, Ceramic Multilayer Technology, Proceedings of the CARTS Europe, Bad Homburg, Germany, Sep. 2006, 12 pages.

Kageyama, T., Murata's Ceramic Capacitor Serves Next Series of Power Electronics, AEI, Technology Focus, Apr. 2007, pp. 31-33.

Kubota, K., et al., "Ceramic Capacitors Aid High-Voltage Designs," Power Electronics Technology, May 2004, pp. 14-23.

März, M., "Automotive Power Electronics Research Roadmap Initiative," ECPE, Fraunhofer Institut Integrierte Systeme and Bauelementetechnologie, 17 pages.

Prymak, J., et al., "Ripple Current Capabilities," 2004 KEMET Technical Update, KEMET Electronics Corp., Aug. 2004, 5 pages.

Sawyer, E., "Low Inductance—Low Temp Rise DC Bus Capacitor Properties Enabling the Optimization of High Power Inverters," PCIM Europe 2010, May 4-6, 2010, 6 pages.

Schuler, S., "Schnell geschalt; Das Schaltverhalten moderner IGBT optimieren (Switched Quickly; Optimize the switching behavior of modern IGBT)," Leistungsbauteile under Stromversorgungen (Power Components under Power Supplies), elektronikJOURNAL, Nov. 2010, pp. 30-32.

"Mega Cap CKG Series," TDK Corporation of America, Rev. F10, 1 page.

Tsurumi, T., et al., "Size Effect of Barium Titanate and Computer-Aided Design of Multilayered Ceramic Capacitors," IEEE Transactions on Ultrasonics, Ferroelectrics, and Frequency Control, vol. 56, No. 8, Aug. 2009, pp. 1513-1522.

Vetter, H., "Mission Profile Based PCC Design for Integration into HEV Converter," CARTS Asia 2006, Oct. 9-13, 2006, 10 pages.

* cited by examiner

US 9,905,363 B2

CAPACITOR ARRANGEMENT

This patent application is a national phase filing under section 371 of PCT/EP2014/052545, filed Feb. 10, 2014, which claims the priority of German patent application 10 2013 102 278.2, filed Mar. 7, 2013, each of which is incorporated herein by reference in its entirety.

TECHNICAL FIELD

A capacitor arrangement comprising at least one ceramic multilayer capacitor is specified.

BACKGROUND

Capacitors in high-power applications, for example as AC/DC or DC/DC converters, require a high power density.

International Publication No. WO 2011/085932 A1 describes a capacitor comprising a heating element and also a capacitor region comprising dielectric layers and internal electrodes arranged between the layers, wherein the heating element and the capacitor region are thermally conductively connected to one another in order, for example, to be able to operate the capacitor at a temperature at which the power density is as high as possible.

SUMMARY

Embodiments of the invention specify a capacitor arrangement comprising at least one ceramic multilayer capacitor.

In accordance with at least one embodiment, a capacitor arrangement has a ceramic multilayer capacitor and also a contact arrangement that makes electrical contact with the multilayer capacitor.

The capacitor arrangement described here can be suitable for example for high-power applications. The capacitor arrangement can be used for example as a filter element in the case of an AC/DC or DC/DC converter.

In accordance with a further embodiment, the ceramic multilayer capacitor has a main body. The main body preferably has a parallelepipedal shape. The main body comprises dielectric layers arranged along a layer stacking direction to form a stack. The dielectric layers are preferably embodied as ceramic layers. Furthermore, the main body comprises first and second electrode layers arranged between the ceramic layers. By way of example, in each case one first and one second electrode layer can be arranged at a distance from one another in an identical layer plane. Furthermore, the first and second electrode layers can be arranged in each case in different layer planes of the stack.

In accordance with a further embodiment, the main body comprises a first external contact. The external contact is preferably arranged on a first side surface of the main body and electrically conductively connected to the first electrode layers. Preferably, the first electrode layers are directly electrically conductively connected to the first external contact, that is to say that the first electrode layers directly adjoin the first external contact and are directly connected to the first external contact. The first electrode layers preferably extend as far as the first side surface.

Furthermore, the main body has a second external contact, which is arranged on a second side surface of the main body, said second side surface being opposite the first side surface, and is electrically conductively connected to the second electrode layers. Preferably, the second electrode layers are directly electrically conductively connected to the second external contact, that is to say that the first electrode layers directly adjoin the first external contact and are directly connected to the first external contact. The second electrode layers preferably extend as far as the second side surface.

In accordance with a further embodiment, the contact arrangement has two metallic contact plates, between which the at least one ceramic multilayer capacitor is arranged, wherein the first and second external contacts are electrically conductively connected in each case to one of the metallic contact plates. In this case, the metallic contact plates are not part of the ceramic multilayer capacitor. Rather, one or a plurality of sintered ceramic multilayer capacitors provided with external contacts are arranged between the metallic contact plates.

In accordance with a further embodiment, the metallic contact plates comprise copper. In particular, the metallic contact plates can comprise copper passivated with silver and/or gold, that is to say copper plates provided with an Ag and/or Au coating.

In accordance with a further embodiment, the contact arrangement has metallic grids between the external contacts and the contact plates. In particular, a metallic grid can in each case be arranged between the first external contact and the contact plate that makes electrical contact with the first external contact, and between the second external contact and the contact plate that makes electrical contact with the second external contact. The metallic grids can be copper grids, in particular. The copper grids, which can be embodied in particular as fine-meshed copper grids, can preferably serve as compensation layers between the sputtered capacitor parts, that is to say the external contacts, and the metallic contact plates. This can be advantageous, for example, if the at least one ceramic multilayer capacitor is clamped between the metallic contact plates or is soldered to the latter, as described below.

In accordance with a further embodiment, the capacitor arrangement furthermore has at least two housing parts, between which the contact arrangement and the ceramic multilayer capacitor are arranged. The housing parts can for example be formed from a ceramic or a plastic and be provided for protection and/or for encapsulation of the at least one ceramic multilayer capacitor.

In accordance with a further embodiment, the capacitor arrangement has a clamping device having the housing parts and at least one screw, wherein the housing parts press the contact plates onto the external contacts by means of the screw. By way of example, the housing parts in an assembled form can have a parallelepiped-like shape, wherein the capacitor arrangement has two housing parts embodied in each case in the form of half-shells. By screwing along those side edges of the housing parts which adjoin one another, it is possible for the housing parts to be pressed together, as a result of which the metallic contact plates arranged therein are then also pressed onto the at least one ceramic multilayer capacitor.

As an alternative or in addition to a clamping device, the metallic contact plates can be soldered onto the external contacts of the at least one ceramic multilayer capacitor. A standard solder or preferably also a solder comprising nanosilver can be used for this purpose. The term nanosilver denotes a silver powder having an average grain size of less than 1 μm and more than 50 nm. The metallic contact plates can be soldered in particular onto the external contacts of the at least one ceramic multilayer capacitor at temperatures of less than 300° C., if necessary with a uniaxial force being exerted, which is possible in particular with the aid of a solder comprising nanosilver. A soldering connection which maintains a stable electrical and mechanical contact in the further processing process can be obtained as a result.

The clamping contact and also the solder contact can be provided with metallic goods and without metallic goods between the external contacts and the contact plates.

In accordance with a further embodiment, the capacitor arrangement has a plurality of ceramic multilayer capacitors between the contact plates. The greater the capacitance required for a specific application of the capacitor arrangement, the more individual parts are combined. In other words, a desired member of ceramic multilayer capacitors is arranged between the two metallic contact plates of the contact arrangement depending on the required capacitance of the capacitor arrangement. As a result, the individual ceramic multilayer capacitors can have a standardized size, for example. In the prior art, by contrast, it is known, for the purpose of increasing the capacitance of a ceramic multilayer capacitor, to increase the size thereof in order to be able to arrange a larger number of electrode layers and ceramic layers in the main body. The larger an individual component of this type is made, the more likely there is an increase in the risk of a component failure both in processing and in the use time period. Such risks and additionally those from customer processing can be entirely avoided by virtue of the construction of the capacitor arrangement described here.

In accordance with a further embodiment, the main body of the ceramic multilayer capacitor has a width B along the layer stacking direction of the dielectric layers. In this case, B denotes the spatial extent of the main body of the multilayer capacitor along the layer stacking direction. Furthermore, the main body has a height H perpendicular to the first side surface. The height H can thus be understood as the spatial extent of the main body perpendicular to the first side surface of the main body. Preferably, the height H also runs perpendicular to the second side surface of the main body. Furthermore, the main body has a length L perpendicular to the height H and perpendicular to the layer stacking direction. The length L thus denotes the spatial extent of the main body in a direction perpendicular to the width B and to the height H.

In accordance with a further embodiment, the following relationships hold true for the dimensions B, H and L:
  $B/H \geq 0.2$, preferably $B/H \geq 0.3$, particularly preferably $B/H$ 1.0 or either $B/H \approx 0.35$.
  $L/B \geq 1$, preferably $L/B \leq 5$, particularly preferably $L/B \leq 3.5$.
  $L/H \geq 0.8$, preferably $L/H \geq 1$, particularly preferably $L/H \geq 1.2$.

By virtue of the ratios specified here between the width B and the height H of the main body, in the case of a ceramic multilayer capacitor described here, the ratio of feed cross section of the electrode layers to the useful cross section, that is to say to the capacitance-determining area, can be significantly increased. What can be achieved as a result is that the ceramic multilayer capacitor described here has a particularly low ESR value ("equivalent series resistance"). By way of example, a ceramic multilayer capacitor described here, for instance having a capacitance of between 4 μF and 10 μF, can have an ESR of between 3 mΩ and 5 mΩ during operation at the frequency of between 100 kHz and 1 MHz.

In accordance with a further embodiment, the main body has third electrode layers, which are electrically conductively connected neither to the first nor to the second external contact. Preferably, the third electrode layers are electrically conductively connected to no external contact. Here and hereinafter, the third electrode layers can also be designated as free electrodes ("floating electrodes").

In accordance with a further embodiment, the third electrode layers overlap the first electrode layers. In other words, the third electrode layers in each case have at least one partial region which could be brought to congruence with at least one partial region of the first electrode layers in a mental projection in the layer stacking direction of the stack. Furthermore, the third electrode layers can overlap the second electrode layers. By way of example, in each case one first and one second electrode layer can be arranged at a distance from one another in an identical layer plane of the main body and can in each case overlap at least one third electrode arranged in a further layer plane.

The use of first, second and free third electrode layers, that is to say the use of serial internal electrodes, advantageously brings about an increase in the breakdown field strength, which has a beneficial effect for the robustness and the reliability of the multilayer capacitor. Furthermore, as a result, a reduction of the dielectric layer thickness, that is to say of the layer thickness of the ceramic layers, is made possible, which as a consequence results in an increase in the cross section of an electrode layer per volume ceramic and thus in an improvement of the ESR value and an improvement of the current-carrying capacitor of the component for application currents.

In accordance with a further embodiment, the ceramic layers have a layer thickness of between 3 μm and 200 μm. In accordance with a further preferred embodiment, the ceramic layers have a layer thickness of between 10 μm and 100 μm. Particularly preferably, the ceramic layers have a layer thickness of approximately 25 μm.

In accordance with a further embodiment, the electrode layers have a layer thickness of between 0.1 μm and 10 μm. In accordance with one preferred embodiment, the electrode layers have a layer thickness of between 1 μm and 4 μm. Particularly preferably, the electrode layers have a layer thickness of approximately 3.5 μm.

In accordance with a further embodiment, the main body has at least ten ceramic layers. In accordance with a further embodiment, the main body has at least ten first electrode layers. In accordance with a further embodiment, the main body has at least ten second electrode layers.

In accordance with a further embodiment, the following relationship holds true for the number of first electrode layers provided in the main body and the width B of the main body: ratio of the number of first electrode layers to the width $B \geq 10/mm$. In other words, the main body has at least ten first electrode layers per mm width. Furthermore, the main body preferably has at least ten second electrode layers per mm width.

In accordance with a further embodiment, the electrode layers comprise a base metal. The electrode layers preferably comprise copper. In accordance with one preferred embodiment, the electrode layers consist of copper. Particularly after the sintering of the multilayer capacitor, the electrode layers can consist of pure copper. On account of the high thermal and electrical conductivity of copper, a particularly low ESR value can be obtained in the case of the multilayer capacitor described here. Furthermore, the production process of the multilayer capacity can advantageously be made less expensive by the use of base metals.

In accordance with a further embodiment, the first and second side surfaces on which the external contacts are applied are surface-treated. Particularly preferably, the first and second side surfaces can be lapped. Furthermore, it is also possible for the first and second side surfaces to be ground, scoured or plasma-etched. By means of the surface-treated side surfaces, a particularly good contact between the external contacts and the first and respectively second electrode layers can advantageously be achieved. In particular, by means of the surface treatment of the first and second side surfaces, a ceramic material present between individual first electrode layers and respectively between individual second electrode layers can be withdrawn, such that the first and second electrode layers can be brought to the surface of the main body reliably in terms of process engineering. By way of example, the external contacts can then be applied without penetration of a gas flow, for example by a standard sputtering process.

In accordance with a further embodiment, the first and second external contacts in each case have at least one first sputtering layer, wherein the first sputtering layers are in direct contact with the first or second electrode layers. Preferably, a first layer is applied on the first side surface of the main body, which first layer is in direct contact with exit surfaces of the first electrode layers from the main body. Likewise, a first layer can be applied on the second side surface of the main body, which first layer is in direct contact with exit surfaces of the second electrode layers from the main body. The sputtering layers can have for example a layer thickness of between 0.1 μm and 1.5 μm. The first layers preferably comprise chromium or consist of chromium.

In accordance with a further embodiment, the first and second external contacts in each case have a second sputtering layer, wherein the second layers are preferably applied directly on the first layers. The second layers preferably comprise copper or nickel or consist of copper or nickel.

In accordance with a further embodiment, the first and second external contacts in each case have a third sputtering layer, wherein the third sputtering layers are preferably applied directly on the second sputtering layers. The third sputtering layers preferably comprise gold or consist of gold. Alternatively, the third sputtering layers can also comprise silver or consist of silver.

In particular, the external contacts can have for example sputtering layers comprising a Cr/Cu/Au or a Cr/Cu/Ag or a Cr/Ni/Ag or a Cr/Ni/Au, wherein the sputtering layer stacks are in direct contact with the first and respectively the second electrode layers.

In accordance with a further embodiment, the ceramic layers comprise a ceramic material for which the following formula holds true:

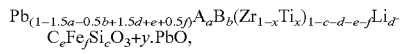

wherein A is selected from a group consisting of La, Nd, Y, Eu, Gd, Tb, Dy, Ho, Er and Yb, B is selected from a group consisting of Na, K and Ag, and wherein C is selected from a group consisting of Ni, Cu, Co and Mn, where $0<a<0.12$, $0.05 \leq x \leq 0.3$, $0 \leq b<0.12$, $0 \leq c<0.12$, $0 \leq d<0.12$, $0 \leq e<0.12$, $0 \leq f<0.12$, $0 \leq y<1$ and $b+d+e+f>0$ hold true.

Preferably, a particularly Zr-rich PZT solid-solution phase is selected from the phase diagram. In addition, the condition $b+d+e+f>0$ stipulates that besides a dopant from the defined group A (rare earth element), at least one element from the group consisting of Li, Na, K, Ag, Fe, Ni, Cu, Co and Mn (lithium, iron and groups B and C) must be present in the ceramic material. As a result, a ceramic material that is sinterable at temperatures of 1000° C. to 1120° C. can be provided, which enables a combination with other substances/materials, not stable at relatively high temperatures, as early as during the method for producing the ceramic material. By way of example, the sintering of the ceramic material ("cofiring" method) with electrode layers composed of base metals, such as silver or copper, for instance, becomes possible. In addition, the ceramic material has a higher switching field strength and/or higher relative permittivity (dielectric constant) compared with the PZT material that is only in group A.

In addition, low sintering temperatures promote the formation of small grain sizes of the ceramic material, which has a favorable influence on the dielectric properties. More precisely, the dielectric properties of PZT ceramics are generally also determined by the domain sides. Domains are understood to be regions in the ceramic having the same polarization. The domain size is a function of the grain size. The number of domains per grain increases as the grain size increases. The altered domain size has consequences for the material properties of the ceramic. Consequently, it is desirable to be able to control the grain size of the grain growth.

Preferably, the doped lead zirconate titanate ceramic has a perovskite lattice that can be described by the general formula $ABO_3$, wherein A stands for the A-sites and B stands for the B-sites of the perovskite lattice. The perovskite lattice is distinguished by a high tolerance toward dopings and vacancies.

The perovskite structure of lead zirconate titanate (PZT) can be described by the general formula $ABO_3$. An elementary cell of the PZT crystal lattice can be described by a cube. The A-sites are occupied by $Pb^{2+}$ ions situated on the corners of the cube. An $O^{2-}$ ion is in each case situated in the center of each cube face. A $Ti^{4+}$ ion and a $Zr^{4+}$ ion are situated in the center of the cube (B-sites). This structure has a high tolerance towards substitution of the metal ions by other metal ions and defects, for which reason it can be doped well.

Depending on the difference in size between the ion introduced by doping and the replaced ion, the highly symmetrical coordination polyhedron can be distorted. This distortion can alter the center of symmetry of the crystal and thus influence the polarizability.

The various possibilities for doping can be classified on the bases of the valency of the doping ion. Isovalent doping, that is to say the replacement of one ion by another ion having the same valency, does not affect possible vacancies in the ceramic material. If lower-valency cations (acceptors) replace cations having a higher valency, then vacancies are produced in the anion lattice. Higher-valency cations (donors), if they replace lower-valency cations, cause vacancies in the cation lattice. The doping with acceptors and donors leads in each case to characteristic changes in the material properties. Acceptor-doped ceramics are also referred to as "hard" ceramics, and donor-doped ceramics as "soft" ceramics.

A doping, for example with $Nd^{3+}$ (or some other rare earth element from group A), on the A-sites constitutes a donor doping. On account of the ionic radius of neodymium, the latter is incorporated on the $Pb^{2+}$ sites. The charge equalization takes place as a result of the corresponding formation of Pb vacancies. The doping has the effect of metric changes in the lattice and of influencing relatively long acting interactions between the elementary cells.

A doping, for example with $K^+$ or $Fe^{3+}$, on the A- and/or B-sites constitutes an acceptor dopant. On account of the anionic radius of potassium, the latter is incorporated on the $Pb^{2+}$ sites, while $Fe^{3+}$ is incorporated on the $Zr^{4+}$ and/or $Ti^{4+}$ sites. The charge equalization takes place as a result of the reduction of $Pb^{2+}$ vacancies (A-vacancies) and/or the corresponding formation of oxygen vacancies. The doping has the effect of grain growth and oxygen vacancy formation which provides sintering densification and which is induced by K acceptors at the sintering temperature. In the cooling process, recombination with the Nd donors with the formation of quasi-neutral {Nd/K} defect pairs can take place, such that no or only a very low lead or oxygen vacancy concentration is present in the finished ceramic.

This doping affects the grain growth of the material, which is dependent on the concentration of the introduced doping. In this case, small amounts of doping contribute to the grain growth, whereas excessively large amounts of doping ions can inhibit the grain growth.

The properties of donor-doped PZT materials, such as are present in the case where Nd occupies Pb sites, are substantially based on an increased domain mobility caused by the Pb vacancies. The vacancies have the effect that the domains can already be influenced by small electric fields. This leads to an easier displaceability of the domain boundaries and thus to higher dielectric constants in comparison with undoped PZT ceramics.

Acceptor and donor dopings are present simultaneously in the ceramic material. This has the effect that the negative properties which occur when the ceramic was doped with only one of the two types of doping are compensated for. By way of example, if only an acceptor doping were present, then this often leads to decreasing dielectric constants, that is to say that the constants are less than those of the undoped ceramic. If only a donor doping is present, then the grain growth is inhibited and the bodies of the ceramic do not attain the desired size. The combination of the dopings present contrasts positively with the undoped ceramic in these points, however. It has higher dielectric constants, which is the case even at lower sintering temperatures.

In accordance with one preferred embodiment, $0.1 \leq x \leq 0.2$ holds true, since the polarization curves can be set better in this range.

In accordance with one preferred embodiment, it holds true that $0 \leq y < 0.05$.

In accordance with one preferred embodiment, it holds true that $0.001 < b < 0.12$, wherein with further preference $d=e=f=0$ holds true.

In accordance with one preferred embodiment, it holds true that $0.001 < e < 0.12$, wherein with further preference $b=d=f=0$ holds true.

In accordance with a further preferred embodiment, B is sodium (Na). The material properties are influenced particularly advantageously as a result of this; in particular, the sintering temperature is reduced in comparison with PZT material containing only a rare earth element, and the switching field strength is increased at the same time.

In accordance with a further preferred embodiment according to the invention, the relative permittivity at an electric field strength of 1 kV/mm, preferably 2 kV/mm, is at least 60% of the relative permittivity at an electric field strength of 0 kV/mm. With further preference, the relative permittivity (dielectric constant) of the ceramic material at a field strength of 2 to 5 kV/mm, preferably 1 kV/mm to 10 kV/mm, is at least 60% of the relative permittivity at an electric field strength of 0 kV/mm. The measurements are preferably carried out at a temperature of the ceramic material of 125° C.

In accordance with a further preferred embodiment according to the invention, the ceramic material has a relative permittivity of at least 500, preferably at least 1500, at an electric field strength of 1 kV/mm, preferably 2 kV/mm. With further preference, the ceramic material has a relative permittivity of at least 500, preferably at least 1500, at an electric field strength of 2 to 5 kV/mm, preferably 1 kV/mm to 10 kV/mm. The measurements are preferably carried out at a temperature of the ceramic material of 125° C.

The measurement of polarization hysteresis is a standard method for determining the relative permittivity (dielectric constant). For frequency-independent measurement, quasi-static methods are known wherein the hysteresis loop is measured point by point. By way of example, polarization measurements can be carried out with the aid of the TF Analyser 2000 from aixACCT Systems GmbH.

In accordance with a further preferred embodiment according to the invention, the ceramic material is an antiferroelectric dielectric. For this purpose, the basic material PZT is preferably used from the antiferroelectric-orthorhombic phase region (O-phase). The antiferroelectric order is characterized by a superimposition of a plurality of polar sublattices, the electric dipole moments of which cancel one another out. An antiferroelectric crystal thus has no spontaneous polarization, but does have special dielectric properties. If an electric field is applied to the antiferroelectric, it behaves firstly like a linear dielectric. Starting from a specific critical field strength, an abrupt transition to the ferroelectric phase is induced and the formerly antiparallel dipoles flip over to the then energetically more expedient, parallel, orientation. By contrast, the opposite transition takes place at a lower field strength. This results in a so-called double hysteresis loop.

Antiferroelectric ceramic materials have a less highly pronounced polarization-field strength hysteresis compared with ferroelectric ceramic materials. This results in lower energetic losses in the case of use in capacitors. For this reason, the use of antiferroelectric ceramic materials is preferred according to the invention.

In order to produce pure and differently doped lead zirconate titanate (PZT) powders, it is possible to use the traditional mixed oxide method or else solvent-based methods, also called "sol-gel" methods. The starting point is e.g. solutions of the acetates or alkoxides of the constituent metals, which are converted into granulated xerogels, the ceramic precursor substances, by means of various drying methods. By way of example, spray drying and spray freeze granulation with subsequent freeze drying are available for the drying. The precursors are subsequently pyrolyzed to form the oxides. Powders produced in this way can be deagglomerated with little outlay and be conditioned for further processing.

The capacitor arrangement described here is distinguished, in particular, by a particularly low ESR value ("equivalent series resistance") and a particularly low ESL value ("equivalent series inductance").

Furthermore, the herein described arrangement of the electrode layers is expedient for process implementation during the production of a multilayer capacitor described herein. Both binder removal and sintering necessitate a gas exchange or equilibrium of binder removal products and process gases, which is fostered in the case of their multilayer capacitor described here. By means of the electrode layers that are relatively short in the lateral direction, the construction promotes an improved possibility for process implementation, whereby as a consequence ceramic parts are possible which are relatively, measured against conventional multilayer capacitors, large even in terms of the volume. Furthermore, in the case of a capacitor arrangement described herein, synergistic effects result from the described arrangement of the electrode layers and the chosen ceramic material of the ceramic layers and the construction of the contact arrangement, which have a positive effect on the ESR value, the ESL value and the mechanical and thermal robustness. By way of example, the combination of the ceramic together with the above-indicated aspect ratios between B, H and L and with the geometry of the electrode layers can improve the electrical and thermal properties of the component. In this regard, by way of example, the short paths that can be taken by the current through the electrode with geometry effect, together with the thermal stability of the insulation resistance (ceramic property) have an extremely positive effect on the current-carrying capacity behavior of the component.

The measures described herein made it possible to create a capacitor arrangement which had a capacitance of 30.5 μF at 350 V. Furthermore, the capacitor arrangement according to the invention had an ESR of 0.5 mΩ, which corresponds to a product of ESR and capacitance of approximately 15 mΩμF. Furthermore, an ESL of 10 nH, a derived net power density of 5.5 μF/cm$^3$, an energy density of 1.5 J/cm$^3$, a bias dependence (200-500 V) of approximately +/−25%, a temperature dependence in the range of −40° C. to +105° C. of approximately +/−15% and a loss angle of 0.5% resulted. Compared with the characteristic values of other technologies such as, for example, film capacitors, aluminum capacitors and conventional multilayer capacitors, this shows that capacitor values not attained heretofore are possible with the capacitor arrangement described here. In particular, two major advantages of the capacitor arrangement described here should be mentioned: firstly, the ESR is so low that the lowest possible capacitance values are necessary for compensating for ripple voltages. In this case, smaller capacitance values accomplish the same function as in some instances much greater values in other technologies, which means a very great cost advantage at the system level or making level. Furthermore, the capacitance densities are higher than in other technologies, such that these components can be brought nearer to power semiconductors on account of the resulting miniaturization of the components. Line inductances can be reduced as a result. The intrinsically very low inductance of the capacitor arrangement described here takes effect to a greater degree as a result and the capacitor arrangement described here can be realized overall significantly more cost-effectively with the same function in comparison with conventional technologies.

BRIEF DESCRIPTION OF THE DRAWINGS

Further advantages, advantageous embodiments and developments will become apparent from the exemplary embodiments described below in association with the figures.

In the figures.

In the exemplary embodiments and figures, elements that are identical, of identical type or act identically may be provided in each case with the same reference signs. The illustrated elements and outside relationships among one another should not be regarded as true to scale; rather, individual elements such as, for example, layers, components parts, components and regions may be illustrated with exaggerated size in order to enable better illustration and/or in order to afford a better understanding.

DETAILED DESCRIPTION OF ILLUSTRATIVE EMBODIMENTS

Figure 1:
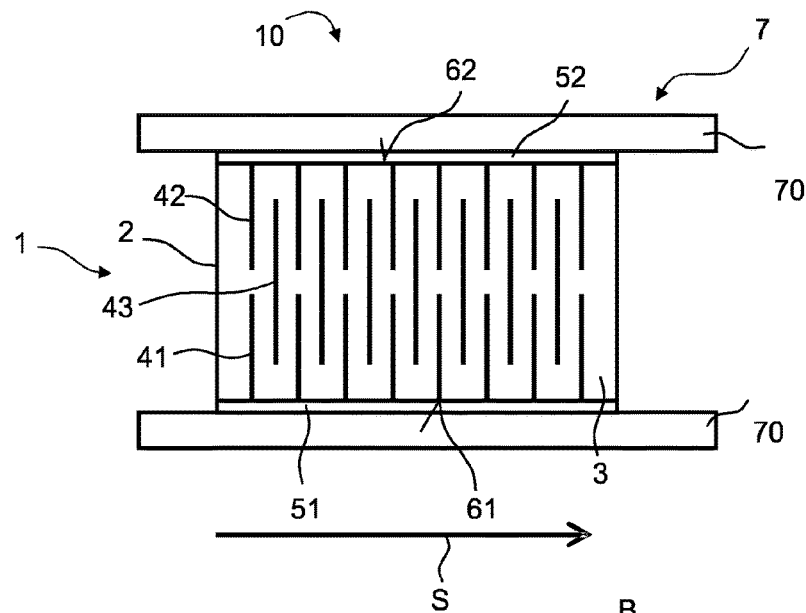
FIG. 1 shows a schematic illustration of a capacitor arrangement in accordance with one exemplary embodiment.

FIG. 1 shows a capacitor arrangement 10 in accordance with one exemplary embodiment. The capacitor arrangement 10 has a ceramic multilayer capacitor 1 in a contact arrangement 7.

The multilayer capacitor 1 comprises a main body 2 having a parallelepipedal shape having six side surfaces. The main body 2 has ceramic layers 3 and first and second electrode layers 41, 42 arranged between the ceramic layers 3, wherein the ceramic layers 3 and the electrode layers 41, 42 are arranged along a layer stacking direction S to form a stack. In particular, the main body 2 has at least 10 first and at least 10 second electrode layers 41, 42. In the exemplary embodiment shown here the ceramic layers 3 have a layer thickness of approximately 25 μm. The electrode layers 41, 42 have a layer thickness of approximately 3.5 μm. Alternatively, the ceramic layers 3 and the electrode layers 41, 42 can also have other layer thicknesses.

The electrode layers comprise copper in the exemplary embodiment shown. As a result, firstly what can be achieved is that the multilayer capacitor 1 has an ESR value that is as small as possible, and secondly the process for producing the multilayer capacitor 1 can be made less expensive.

The multilayer capacitor 1 furthermore has a first external contact 51, which is arranged on a first side surface 61 of the main body 2, and also a second external contact 52, which is arranged on an opposite second side surface 62 of the main body 2. In this case, the first electrode layers 41 are electrically conductively connected to the first external contact 51 and the second electrode layers 42 are electrically conductively connected to the second external contact 52. The first and second side surfaces 61, 62 are surface-treated, wherein the surface treatment is preferably carried out before the external contacts 51, 52 are applied. In particular, the first and second side surfaces 61, 62 can preferably be lapped or alternatively also be scoured, ground or plasma-etched. By means of the surface-treated side surfaces 61, 62, it is advantageously possible to achieve a particularly good contact between the external contacts 51, 52 and the first and respectively second electrode layers 41, 42.

In the exemplary embodiment shown here in each case one first and one second electrode layer 41, 42 are arranged at a distance from one another in an identical plane. This plane is formed by a layer plane embodied perpendicularly to the layer stacking direction S of the stack. In this case, a so-called gap is present between the first electrode layers 41 and the second electrode layers 42. This gap constitutes a region between a first electrode layer 41 and a second electrode layer 42 in the layer plane in which no electrode layers are arranged. In accordance with one alternative exemplary embodiment, it is also possible for the first and second electrode layers 41, 42 in each case to be arranged in different layer planes.

The main body 2 furthermore has third electrode layers 43, which are electrically conductive connected neither to the first nor to the second external contact 51, 52. The third electrode layers 43 overlap both the first and the second electrode layers 41, 42, that is to say that the third electrode layers 43 in each case have at least one partial region which could be brought to congruence with at least one partial region both of the first and of the second electrode layers 41, 42 in a metal projection in the layer stacking direction S of the stack. In accordance with the alternative exemplary embodiment in which the first and second electrode layers 41, 42 are in each case arranged in different layer planes, it is possible for the first and second electrode layers 41, 42 to overlap one another.

The first and second external contacts 51, 52 in each case have a multilayered sputtering layer applied in each case directly on the main body 2. In particular, the external contacts in the exemplary embodiment shown are formed in each case by a Cr/Cu/Au or Cr/Cu/Ag or Cr/Ni/Au or Cr/Ni/Ag layer sequence.

The contact arrangement 7 has two metallic contact plates 70, between which the ceramic multilayer capacitor 1 is arranged. In this case, the external contacts 51, 52 are electrically conductively connected in each case to one of the metallic contact plates 70. The electrical contact is produced by a direct contact between the metallic contact plates and the external contacts 51, 52 in the exemplary embodiment in accordance with FIG. 1. Further types of electrical contact-making between the external contacts 51, 52 and the contact plates 70 are described in association with the exemplary embodiments in FIGS. 3 to 6.

The metallic contact plates comprise in particular copper, particularly preferably copper passivated with Ag and/or Au.

While in the case of conventional multilayer capacitors, in order to increase the capacitance, the volume and thus the number of the electrode layers and of the ceramic layers are increased, in the case of the capacitor arrangement 10 shown here it is also possible for a plurality of ceramic multilayer capacitors 1 to be arranged between the metallic contact plates 70 of the contact arrangement 7. As a result, it is not necessary to enlarge the ceramic multilayer capacitor 1 itself, where risks in processing and also during use can be avoided.

Figure 2:
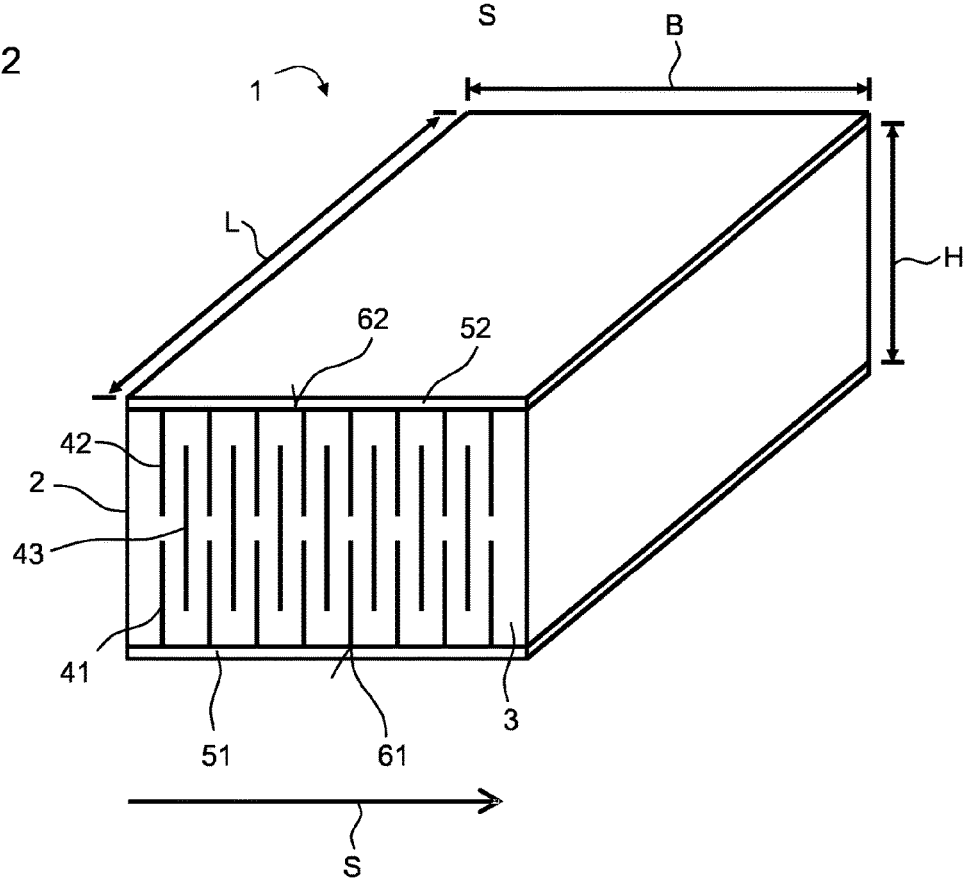
FIG. 2 shows a schematic illustration of a ceramic multilayer capacitor in accordance with a further exemplary embodiment.

FIG. 2 shows one exemplary embodiment of a ceramic multilayer capacitor having a construction like the multilayer capacitor 1 described in association with FIG. 1, in conjunction with an advantageous geometrical configuration.

The main body 2 of the ceramic multilayer capacitor 1 has a width B along the layer stacking direction S. In other words, B denotes the extent of the main body 2 in a direction parallel to the layer stacking direction S. Preferably, at least 10 first electrode layers and at least 10 second electrode layers are provided in the main body 2 per mm width B of the main body. Furthermore, the main body 2 has a height H perpendicular to the first side surface 61. The main body 2 therefore has, perpendicular to the first side surface 61, an extent corresponding to the height H. Furthermore, the main body 2 has, perpendicular to the height H, perpendicular to the layer stacking direction S, a length L corresponding to the extent of the main body 2 perpendicular to the layer stacking direction and perpendicular to the height H. For the ratio of the width B to the height H of the main body 2 it holds true that $B/H \geq 0.2$. Furthermore, for the ratio of the length L to the width B of the main body, it holds true that $L/B \geq 1$, and for the ratio of the length L to the height H of the main body, it holds true that $L/H \geq 1$.

In the exemplary embodiment shown, the main body 2 has a width B of approximately 2.5 mm, a height H of approximately 7.0 mm and a length L of approximately 7.0 mm. Consequently, the ratio B/H in the exemplary embodiment shown is approximately equal to 0.36. The ratio L/B is approximately 2.8 and the ratio L/H is approximately 1.0.

The multilayer capacitor 1 in accordance with the exemplary embodiment shown is distinguished in particular by a low ESR value, a low ESR value and a high mechanical and thermal robustness. By way of example, the ceramic multilayer capacitor shown (380 V/10 μF, has the following frequency-dependent levels: ESR(min)–3 mΩ, ESR(100 kHz)=5 mΩ and ESL<4 nH. Furthermore, the multilayer capacitor 1 can be produced cost-effectively.

The ceramic multilayer capacitors 1 described in association with FIGS. 1 and 2 can comprise in particular a ceramic material described above in the general part, in particular an antiferroelectric dielectric.

The further exemplary embodiments of capacitor arrangements shown in FIGS. 3 to 6 constitute modifications and developments of the capacitor arrangement 10 shown in FIG. 1, and so the following description is essentially restricted to the differences and developments.

Figure 3:
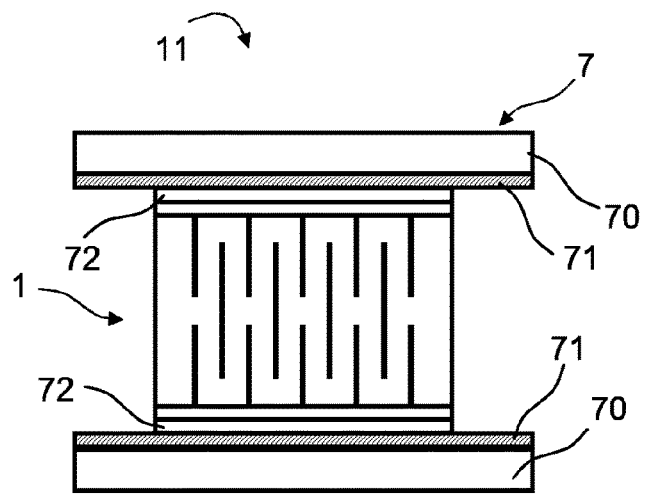
FIGS. 3 to 7 show a schematic illustrations of a capacitor arrangements in accordance with further exemplary embodiments.

FIG. 3 shows a capacitor arrangement 11 in accordance with a further exemplary embodiment, in which the contact arrangement 7 has a metallic grid 71 in the form of a copper grid on that side of each of the metallic contact plates 70 which faces the ceramic multilayer capacitor 1. Such a, preferably fine-meshed, copper grid can serve as a compensation layer between the sputtered external contacts 51, 52 and the metallic contact plates 70. The ceramic multilayer capacitor 1 is connected to the metallic contact plates 70 by means of solder layers 72 between the external contacts 51, 52 and the metallic contact plates 70 of the contact arrangement 7. Besides the standard solder layer, in particular a solder layer comprising nanosilver, which means silver powder having an average grain size of less than 1 μm and more than 50 nm, is advantageous, which can be soldered at temperatures of less than 300° C., if appropriate with a uniaxial pressure being exerted. As a result, it is possible to obtain a soldering connection which enables a stable electrical and mechanical contact in further processing processes.

Figure 4:
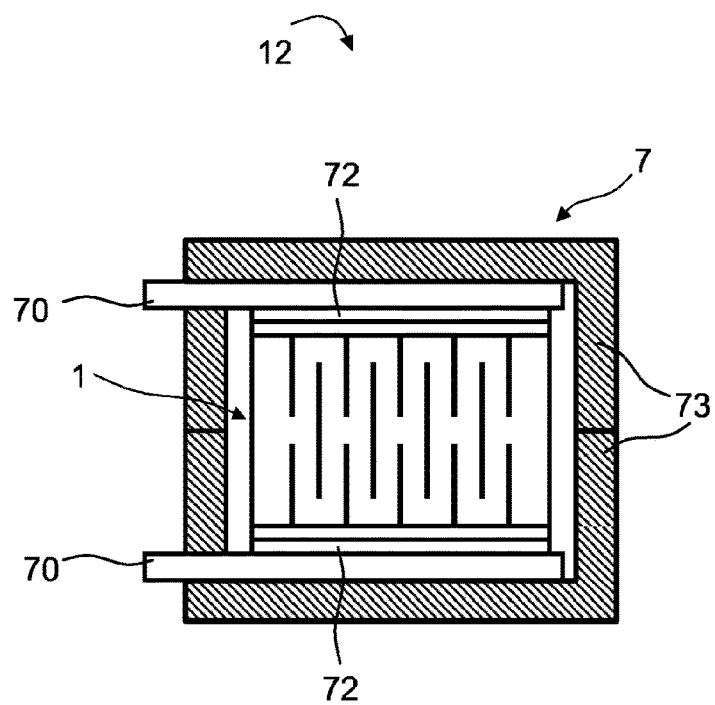

FIG. 4 shows a capacitor arrangement 12 in accordance with a further exemplary embodiment, in which only a solder layer 72, as described for example in association with FIG. 3, without an additional metallic grid is arranged between the metallic contact plates 70 of the contact arrangement 7 and the external contacts 51, 52 of the ceramic multilayer capacitor 1. Furthermore, the capacitor arrangement 12 has two housing parts 73, between which the contact arrangement 7 and the ceramic multilayer capacitor 1 are arranged. The housing parts 73 can for example comprise or consist of a plastic and/or a ceramic material.

Figure 5:
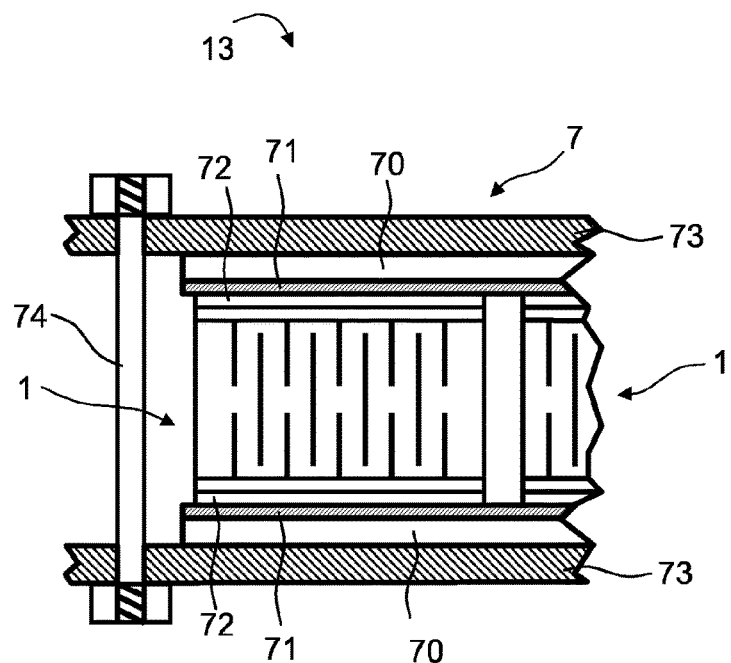
Figure 6:
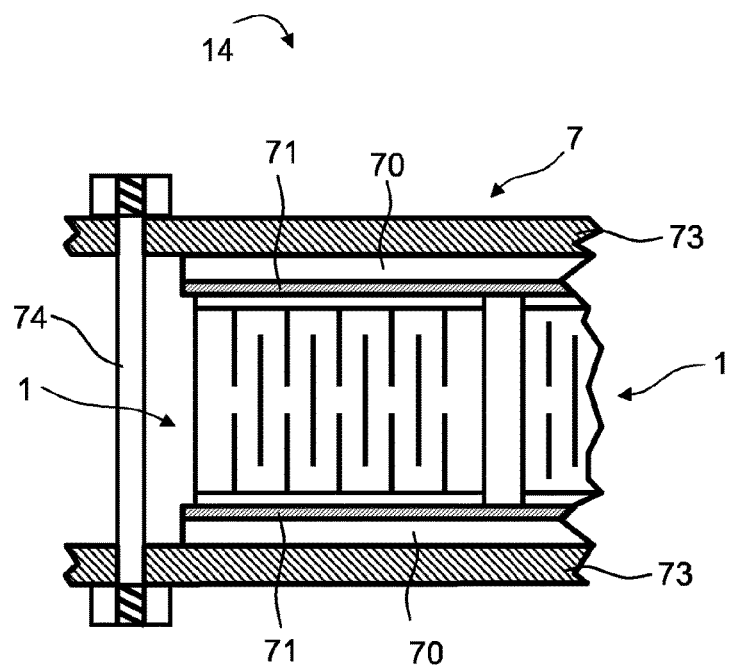

FIGS. 5 and 6 show excerpts from capacitor arrangements 13, 14 in accordance with further exemplary embodiments comprising a plurality of ceramic multilayer capacitors 1, in which the housing parts 73 together with at least one screw 74 form a clamping arrangement, such that the housing parts 73 press the contact plates 70 onto the external contacts of the ceramic multilayer capacitor 1 by means of the at least one screw 74. As is shown in FIG. 5, the contact arrangement 7 can have metallic grids 71 and solder layers 72, as described in association with FIG. 3. As an alternative thereto, it is also possible for the ceramic multilayer capacitors 1 to be arranged in a manner clamped between the contact plates 70 of the contact arrangement 7 without solder layers 72, as is shown in FIG. 6. In particular, by means of the clamping arrangement shown in FIGS. 5 and 6, it is possible to create capacitor arrangements which have a low ESL and ESR in conjunction with high mechanical and thermal robustness.

As an alternative to the exemplary embodiments shown in FIGS. 5 and 6, the contact arrangement 7 can also be embodied without metallic grids 71.

Figure 7:
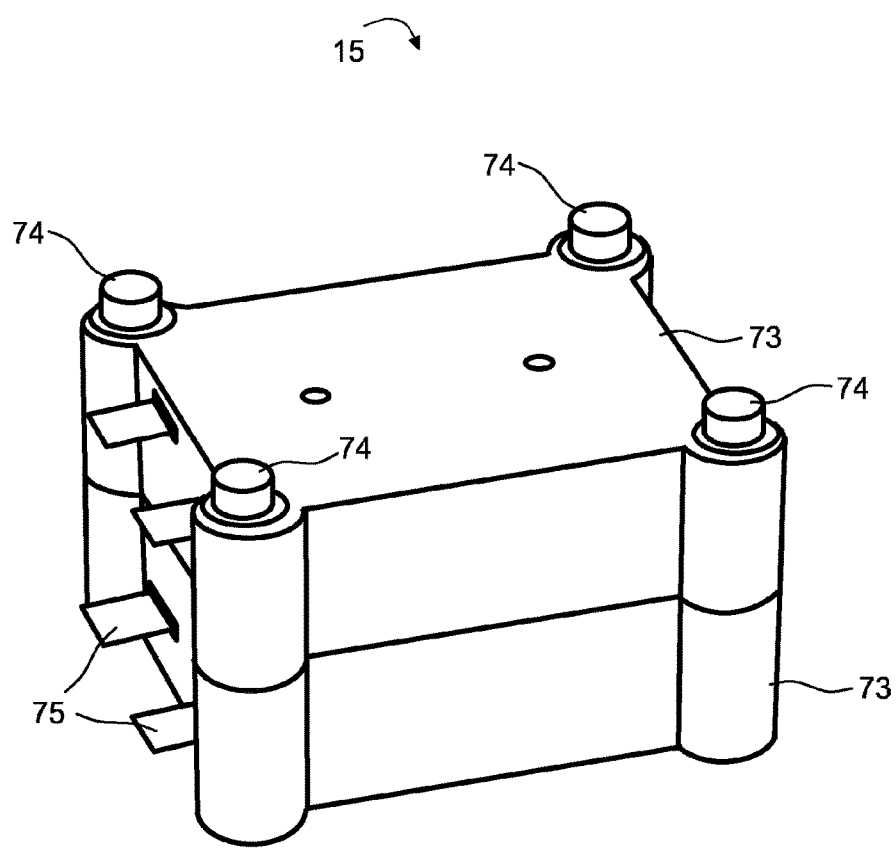

FIG. 7 shows a capacitor arrangement 15 in accordance with a further exemplary embodiment in a three-dimensional plan view, which has two clamped layers—lying one above the other—of ceramic multilayer capacitors in order to increase the absolute value of the capacitance in a housing comprising two housing parts 73. By means of contacts 75, it is possible to make electrical contact with the ceramic multilayer capacitors in the interior of the housing, wherein the construction of the contact arrangement and of the ceramic multilayer capacitors in the interior of the housing can be embodied in accordance with the previous exemplary embodiments. The housing parts 73 are embodied in each case in the form of a half-shell and, joined together, have a parallelepiped-like shape. Along the adjacent edges of the two housing parts 73, screws 74 are provided in corresponding receptacles of the housing parts 73, as a result of which the clamping contact as described above in association with FIGS. 5 and 6 is possible.

The exemplary embodiments of contact arrangements shown in the figures can alternatively or additionally also have further features in accordance with the description in the general part, even if these are not explicitly described in association with the figures.

The invention here is not restricted to the exemplary embodiments by the description on the basis of said exemplary embodiments. Rather, the invention encompasses any novel feature and also any combination of features, which in particular includes any combination of features in the patent claims, even if this feature or this combination itself is not explicitly specified in the patent claims or exemplary embodiments.

The invention claimed is:

1. A capacitor arrangement comprising:
a ceramic multilayer capacitor having a main body comprising ceramic layers and first and second electrode layers arranged therebetween, the ceramic multilayer capacitor also having a first external contact and a second external contact on mutually opposite side surfaces,
wherein the first external contact is electrically conductively connected to the first electrode layers and the second external contact is electrically conductively connected to the second electrode layers,
wherein the ceramic layers are made from an antiferroelectric dielectric,
wherein the first and second electrode layers each comprise a base metal,
wherein the side surfaces on which the first and second external contacts are located are lapped or ground,
wherein the ceramic layers are arranged along a layer stacking direction to form a stack,
wherein the main body has a width B along the layer stacking direction,
wherein the main body has a height H along a direction perpendicular to the side surfaces on which the first and second external contacts are located,
wherein the main body has a length L along a direction perpendicular to the height H and perpendicular to the width B, and
wherein B/H≥1, L/B≥1 and L/H≥1;
a first metallic contact plate, wherein the first external contact is electrically conductively connected to the first metallic contact plate, wherein the first metallic contact plate comprises a copper plate;
a second metallic contact plate, the ceramic multilayer capacitor being arranged between the first metallic contact plate and the second metallic contact plate, wherein the second external contact is electrically conductively connected to the second metallic contact plate, and wherein the second metallic contact plate comprises a copper plate;
a first metallic grid between the first external contact and the first metallic contact plate, wherein the first metallic grid is a copper grid;
a second metallic grid between the second external contact and the second metallic contact plate, wherein the second metallic grid is a copper grid; and
a first solder layer arranged between the first external contact and the first metallic contact plate and a second solder layer arranged between the second external contact and the second metallic contact plate.

2. The capacitor arrangement according to claim 1, wherein the first and second metallic contact plates each comprise copper passivated with gold or silver.

3. The capacitor arrangement according to claim 1, wherein the first and second solder layers each comprise a nanosilver solder layer.

4. The capacitor arrangement according to claim 1, further comprising two housing parts, the first and second metallic contact plates and the ceramic multilayer capacitor being arranged between the two housing parts.

5. The capacitor arrangement according to claim 4, further comprising a clamping device comprising the housing parts and a screw, wherein the housing parts press the first and second metallic contact plates onto the first and second external contacts by means of the screw.

6. The capacitor arrangement according to claim 1, wherein a plurality of ceramic multilayer capacitors are arranged between the first and second metallic contact plates.

7. The capacitor arrangement according to claim 1, wherein the first and second external contacts each have a sputtering layer comprising a Cr/Cu/Au or Cr/Cu/Ag or Cr/Ni/Au or Cr/Ni/Ag layer sequence, wherein each sputtering layer is in direct contact with the first or the second electrode layer.

8. The capacitor arrangement according to claim 1, wherein the main body has third electrode layers between the ceramic layers made from an antiferroelectric dielectric, the third electrode layers comprising a base metal and being electrically conductively connected to no external contact and overlapping the first and second electrode layers.

9. The capacitor arrangement according to claim 1, wherein the ceramic layers comprise a ceramic material for which the following formula holds true:

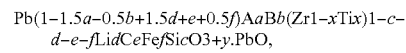

$$Pb(1-1.5a-0.5b+1.5d+e+0.5f)A_aB_b(Zr_{1-x}Ti_x)_{1-c-d-e-f}Li_dCe_eFe_fSi_cO_3+y\cdot PbO,$$

wherein
A comprises an element selected from the group consisting of La, Nd, Y, Eu, Gd, Tb, Dy, Ho, Er and Yb;
B comprises an element selected from the group consisting of Na, K and Ag;
C comprises an element selected from the group consisting of Ni, Cu, Co and Mn; and
0<a<0.12, 0.05≤x≤0.3, 0≤b<0.12, 0≤c<0.12, 0≤d<0.12, 0≤e<0.12, 0≤f<0.12, 0≤y<1 and b+d+e+f>0.

10. The capacitor arrangement according to claim 1, wherein the first and second electrode layers consist of copper.

11. The capacitor arrangement according to claim 1, wherein the main body has at least ten ceramic layers.

12. A capacitor arrangement comprising:
a ceramic multilayer capacitor, which has a main body comprising ceramic layers and first and second electrode layers arranged between the ceramic layers, the ceramic multilayer capacitor also having a first external contact and a second external contact on mutually opposite side surfaces,
wherein the first external contact is electrically conductively connected to the first electrode layers and the second external contact is electrically conductively connected to the second electrode layers,
wherein the ceramic layers are made from an antiferroelectric dielectric,
wherein the first and second electrode layers each comprise a base metal,
wherein the side surfaces on which the first and second external contacts are located are lapped or ground,
wherein the ceramic layers are arranged along a layer stacking direction to form a stack,
wherein the main body has a width B along the layer stacking direction,
wherein the main body has a height H along a direction perpendicular to the side surfaces on which the first and second external contacts are located,
wherein the main body has a length L along a direction perpendicular to the height H and perpendicular to the width B, and
wherein B/H≥1, L/B≥1 and L/H≥1;
a first metallic contact plate, wherein the first external contact is electrically conductively connected to the first metallic contact plate, wherein the first metallic contact plate comprises a copper plate;
a second metallic contact plate, the ceramic multilayer capacitor being arranged between the first metallic contact plate and the second metallic contact plate, wherein the second external contact is electrically conductively connected to the second metallic contact plate and wherein the second metallic contact plate comprises a copper plate;
a first metallic grid between the first external contact and the first metallic contact plate, wherein the first metallic grid is a copper grid;
a second metallic grid between the second external contact and the second metallic contact plate, wherein the second metallic grid is a copper grid;
a first housing part;
a second housing part, the first and second metallic contact plates and the ceramic multilayer capacitor being arranged between the first and second housing parts;
a clamping device having the first and second housing parts and a screw, wherein the first and second housing parts press the first and second metallic contact plates onto the first and second external contacts by means of the screw; and
a first solder layer arranged between the first external contact and the first metallic contact plate and a second solder layer arranged between the second external contact and the second metallic contact plate.

13. The capacitor arrangement according to claim 12, wherein the first and second metallic contact plates each comprise copper plates that are passivated with gold or silver.

14. The capacitor arrangement according to claim 12, wherein
the ceramic layers comprise a ceramic material for which the following formula holds true:

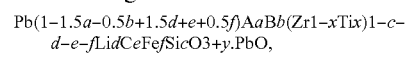

$Pb(1-1.5a-0.5b+1.5d+e+0.5f)A_aB_b(Zr_{1-x}Ti_x)_{1-c-d-e-f}Li_dCe_eFe_fSi_cO_3 + y \cdot PbO,$ wherein
A comprises an element selected from the group consisting of La, Nd, Y, Eu, Gd, Tb, Dy, Ho, Er and Yb;
B comprises an element selected from the group consisting of Na, K and Ag;
C comprises an element selected from the group consisting of Ni, Cu, Co and Mn; and
$0<a<0.12$, $0.05≤x≤0.3$, $0≤b<0.12$, $0≤c<0.12$, $0≤d<0.12$, $0≤e<0.12$, $0≤f<0.12$, $0≤y<1$ and $b+d+e+f>0$.

15. The capacitor arrangement according to claim 12, wherein the first and second solder layers each comprise a nanosilver solder layer.

16. The capacitor arrangement according to claim 12, wherein a plurality of ceramic multilayer capacitors are arranged between the first and second metallic contact plates.

17. The capacitor arrangement according to claim 12, wherein the first and second external contacts each have a sputtering layer comprising a Cr/Cu/Au or Cr/Cu/Ag or Cr/Ni/Au or Cr/Ni/Ag layer sequence, wherein each sputtering layer is in direct contact with the first or the second electrode layer.

18. The capacitor arrangement according to claim 12, wherein the main body has third electrode layers between the ceramic layers made from an antiferroelectric dielectric, the third electrode layers comprising a base metal and being electrically conductively connected to no external contact and overlapping the first and second electrode layers.

19. The capacitor arrangement according to claim 12, wherein the first and second electrode layers consist of copper.

20. The capacitor arrangement according to claim 12, wherein the main body has at least ten ceramic layers.

* * * * *

UNITED STATES PATENT AND TRADEMARK OFFICE
CERTIFICATE OF CORRECTION

PATENT NO. : 9,905,363 B2  
APPLICATION NO. : 14/767015  
DATED : February 27, 2018  
INVENTOR(S) : Engel et al.

Page 1 of 1

It is certified that error appears in the above-identified patent and that said Letters Patent is hereby corrected as shown below:

In the Claims

In Column 14, Lines 54-55, Claim 9, delete the equation and insert:
--$Pb_{(1-1.5a-0.5b+1.5d+e+0.5f)}A_aB_b(Zr_{1-x}Ti_x)_{1-c-d-e-f}Li_dC_eFe_fSi_cO_3 + y \cdot PbO$,--.

In Column 16, Lines 18-19, Claim 14, delete the equation and insert:
--$Pb_{(1-1.5a-0.5b+1.5d+e+0.5f)}A_aB_b(Zr_{1-x}Ti_x)_{1-c-d-e-f}Li_dC_eFe_fSi_cO_3 + y \cdot PbO$,--.

Signed and Sealed this  
Tenth Day of July, 2018

Andrei Iancu  
*Director of the United States Patent and Trademark Office*